US011347420B2

(12) United States Patent
Muthiah et al.

(10) Patent No.: US 11,347,420 B2
(45) Date of Patent: May 31, 2022

(54) ATTRIBUTE MAPPING IN MULTIPROTOCOL DEVICES

(71) Applicant: WESTERN DIGITAL TECHNOLOGIES, INC., San Jose, CA (US)

(72) Inventors: Ramanathan Muthiah, Karnataka (IN); Dinesh Kumar Agarwal, Karnataka (IN); Hitesh Golechchha, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 8 days.

(21) Appl. No.: 16/895,853

(22) Filed: Jun. 8, 2020

(65) Prior Publication Data

US 2021/0382621 A1 Dec. 9, 2021

(51) Int. Cl.
*G06F 3/06* (2006.01)
*G06F 12/10* (2016.01)

(52) U.S. Cl.
CPC ............ *G06F 3/064* (2013.01); *G06F 3/0604* (2013.01); *G06F 3/0679* (2013.01); *G06F 12/10* (2013.01)

(58) Field of Classification Search
CPC ...... G06F 3/064; G06F 3/0679; G06F 3/0604; G06F 12/10
See application file for complete search history.

(56) References Cited

U.S. PATENT DOCUMENTS

| 8,667,248 | B1 | 3/2014 | Neppalli |
| 9,218,278 | B2 | 12/2015 | Talagala et al. |
| 10,310,925 | B2 | 6/2019 | Dubeyko et al. |
| 10,664,183 | B1* | 5/2020 | Weaver ................. G06F 3/0604 |
| 10,997,068 | B1* | 5/2021 | Ebsen ................. G11C 16/0483 |
| 2005/0182881 | A1* | 8/2005 | Chou ............... G06K 19/07733 |
| | | | 711/115 |
| 2011/0029580 | A1 | 2/2011 | Popovski et al. |
| 2019/0187928 | A1* | 6/2019 | Agarwal ............... G06F 3/0619 |

(Continued)

OTHER PUBLICATIONS

"SD Express Cards with PCIe and NVMe Interfaces." SD Association White Paper. Jun. 2018. (Year: 2018).*

(Continued)

*Primary Examiner* — Francisco A Grullon
(74) *Attorney, Agent, or Firm* — ArentFox Schiff LLP (57) ABSTRACT

Aspects of a multi-protocol storage device including a memory and a controller are provided which allow for endurance and other storage requirements of a host to be maintained for different logical regions of memory without disruption due to protocol switching. The memory includes blocks that are each associated with a storage attribute such as high endurance, performance, or protection. While operating in a first mode such as NVMe, the controller receives a mapping of storage attributes to different logical regions and stores the mapping in memory. The controller also associates blocks to logical addresses based on the mapping. When the controller switches to a second mode such as SD in response to a host command, the controller reads the mapping from memory and similarly associates blocks to logical addresses based on the mapping in the second mode. Storage attributes thus remain applicable across modes when mapping and storing data.

20 Claims, 5 Drawing Sheets

(56) References Cited

U.S. PATENT DOCUMENTS

2020/0143118 A1* 5/2020 Inagaki ................. G06F 13/385
2020/0233818 A1* 7/2020 Hsieh .................. G06F 13/1668
2021/0397352 A1* 12/2021 Muthiah ............... G06F 3/0646

OTHER PUBLICATIONS

SD Association, "SD Express Cards with PCIe and NVMe Interfaces", Jun. 2018, pp. 1-10, www.sdcard.org.

* cited by examiner

ATTRIBUTE MAPPING IN MULTIPROTOCOL DEVICES

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Flash storage devices may interface with a host using different protocols, including Non-Volatile Memory Express (NVMe) and Secure Digital (SD). For example, flash storage devices operating under the NVMe protocol (i.e. NVMe devices) may communicate with the host using a PCI express (PCIe) bus, while flash storage devices operating under the SD protocol (i.e. SD cards) may communicate with the host using a SD interface, e.g. a High Speed or an Ultra High Speed (UHS) bus. Moreover, some flash storage devices may operate under multiple protocols (i.e. multi-protocol devices). For example, SD Express cards are multi-protocol devices which may interface with the host using the PCIe express bus when operating under the NVMe protocol (in an NVMe mode), and using the SD interface when operating under the SD protocol (in an SD mode).

SUMMARY

One aspect of a storage device is disclosed herein. The storage device includes a memory and a controller. The memory includes a plurality of blocks, where each of the blocks is associated with a storage attribute. The controller is configured to receive a mapping of the storage attributes to different logical regions, and to store the mapping in the memory during a first operation mode of the controller. The controller is further configured to read the mapping from the memory during a second operation mode of the controller, and to map the plurality of blocks to logical addresses based on the mapping during the second operation mode.

Another aspect of a storage device is disclosed herein. The storage device includes a memory and a controller. The memory includes a plurality of blocks, where each of the blocks is associated with a storage attribute. The controller is configured to switch between a first operation mode and a second operation mode, and to store in the memory a mapping of the storage attributes to different logical regions during the first operation mode. The controller is further configured to read the mapping from the memory during the second operation mode, and to map the plurality of blocks to logical addresses based on the mapping during the second operation mode.

A further aspect of a storage device is disclosed herein. The storage device includes a memory and a controller. The memory includes a first plurality of blocks and a second plurality of blocks, where each of the first plurality of blocks and each of the second plurality of blocks is associated with a storage attribute. The controller is configured to map the first plurality of blocks to logical addresses based on the storage attributes during a first operation mode of the controller, and to store in the memory a mapping of the storage attributes to different logical regions during the first operation mode. The controller is further configured to read the mapping from the memory during a second operation mode of the controller, and to map the second plurality of blocks to the logical addresses based on the mapping during the second operation mode.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Generally, NVMe devices or multi-protocol devices operating in an NVMe mode mark different namespaces or logical regions in flash memory according to storage requirements of the host. For example, NVMe devices may group logical regions into different endurance groups based on a number of program and erase (P/E) cycles that associated blocks with those logical regions have endured. For instance, one logical region of memory may be categorized as a high endurance region by the host, and thus be assigned by the storage device to blocks with less P/E cycles (i.e. healthy blocks). Additionally, another logical region of memory may be categorized as a high protection region by the host with lower endurance requirements, and thus be assigned by the storage device to blocks with strong error correction code (ECC) protection albeit possibly more P/E cycles. Multi-protocol devices operating in an NVMe mode may configure device storage similarly based on such mappings (e.g. logical region or namespace 0 is high endurance, logical region or namespace 1 is high protection, etc.).

In contrast, SD devices typically do not mark logical regions into different endurance groups or other storage attribute-based groups. For example, SD devices may consider the memory as a single namespace or logical region, and assign free physical blocks to logical addresses in that region irrespective of the blocks' endurance level (e.g. number of P/E cycles), performance level (e.g. NAND latency), protection level (e.g. ECC protection), or other storage attribute. In other words, SD devices generally configure device storage based on a single logical entity associated with one common storage attribute (i.e. available or not available), unlike NVMe devices.

As a result, it is possible for host storage requirements to be disrupted in multi-protocol devices that switch between different protocols or modes (e.g. between SD and NVMe modes). As an example, assume that an SD Express storage device receives an indication from the host that a particular logical region (e.g. LBAs 1048576-1073741824) is for high endurance use. Accordingly, in the NVMe mode, the storage device may assign blocks from a limited pool or queue of healthy blocks (e.g. with less P/E cycles) to those logical addresses within the logical region to meet the host's endurance requirements. However, if the storage device later switches to the SD mode in response to a command from the host (or another host), the storage device may instead allocate physical blocks which are first available for use to that logical region, regardless of storage attributes (including blocks in the limited queue of healthy blocks). As a result, when the storage device switches back to the NVMe mode in response to another command from the host (or another host), fewer healthy blocks may remain available for assignment to the high endurance logical region, leading to reduced capacity of the storage device to meet host endurance requirements.

To address this problem in multi-protocol devices and optimize the storage capacity of such devices, the storage device described in the present disclosure allows for storage attributes received and applied to logical regions in one mode of operation (e.g. the NVMe mode) to be similarly applied in another mode of operation (e.g. the SD mode). When the controller receives from a host a mapping or configuration of logical regions to storage attributes (e.g. namespace 0 is high endurance, namespace 1 is high performance, etc.), the controller stores this configuration as metadata in non-volatile memory while operating in the NVMe mode. The controller may also store a second mapping or configuration indicating the physical blocks which are assigned for different logical regions in the NVMe mode according to set endurance use cases or based on other storage attributes. For instance, the second configuration may indicate that one group of blocks (e.g. healthy blocks having contiguous or non-contiguous physical addresses within one or more dies) are assigned to one namespace (e.g. high endurance logical region including LBAs 1048576-1073741824), while another group of blocks (e.g. healthy blocks having different contiguous or non-contiguous physical addresses within the one or more dies) are assigned to another namespace (e.g. a high performance logical region including different LBAs). During the NVMe mode, when the controller receives a write command including a logical address from a host, the controller may map the logical address to a physical address of a block based on these configurations or mappings and store data in the allocated block accordingly.

Subsequently, the controller may switch the storage device to operate in the SD mode, e.g., in response to a command from the host. When the controller is operating in the SD mode, the controller may read the metadata from the NVM to identify the configurations that were stored during the NVMe mode (e.g. the mappings of storage attributes and assigned blocks to different logical regions). Thus, when the controller receives another write command including a logical address from a host during the SD mode, the controller may similarly map the logical address to a physical address of a block based on these configurations or mappings (rather than based on first availability) and may store data in the allocated block accordingly. In this way, when the controller later switches back to the NVMe mode, e.g. in response to another command from a host, the controller may continue to allocate blocks to logical addresses based on storage attributes with maintained compatibility between the modes.

Figure 1:
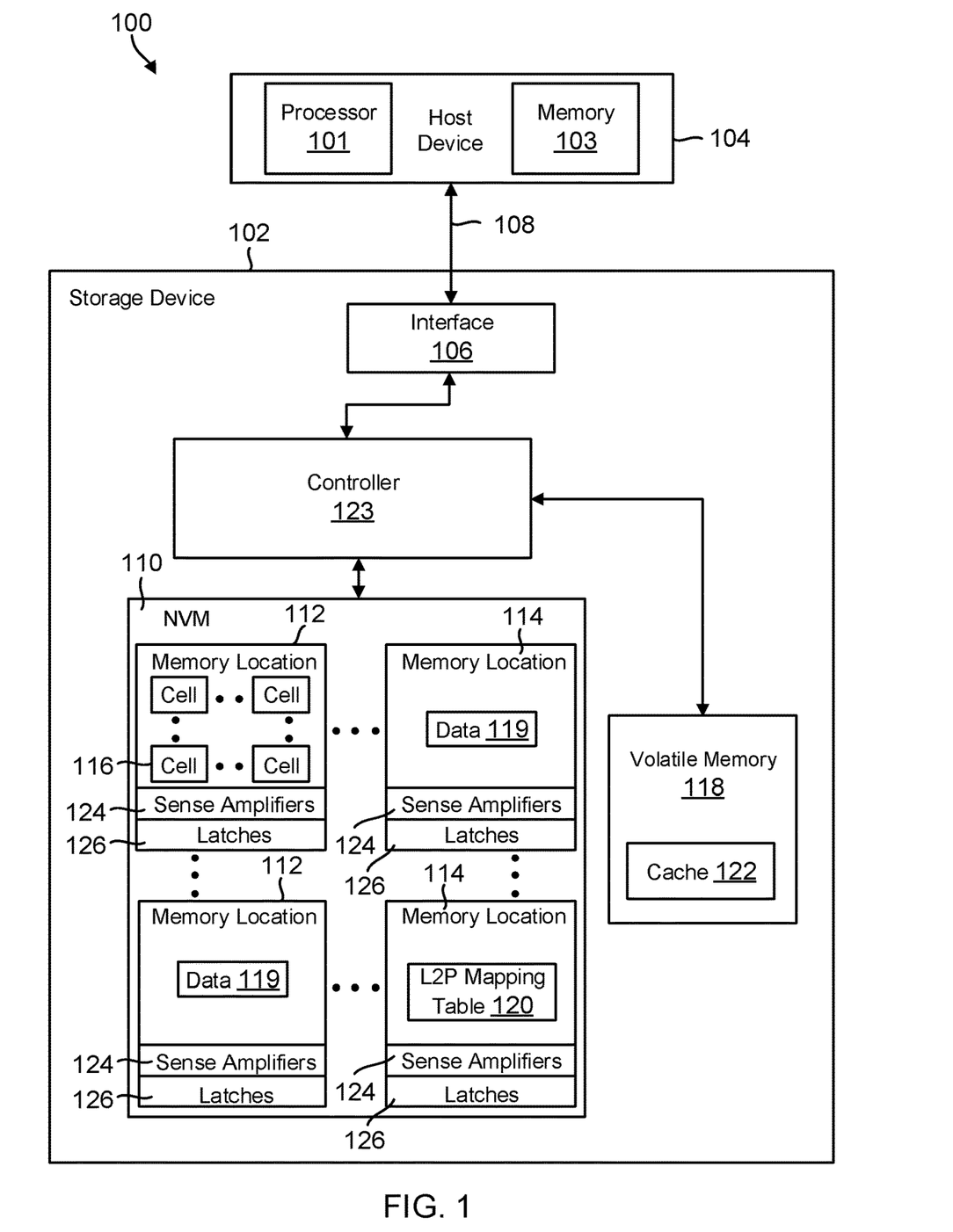
FIG. 1 is a block diagram illustrating an exemplary embodiment of a storage device in communication with a host device.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be single-level cells, multi-level cells, triple-level cells, quad-level cells, and/or penta-level cells, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
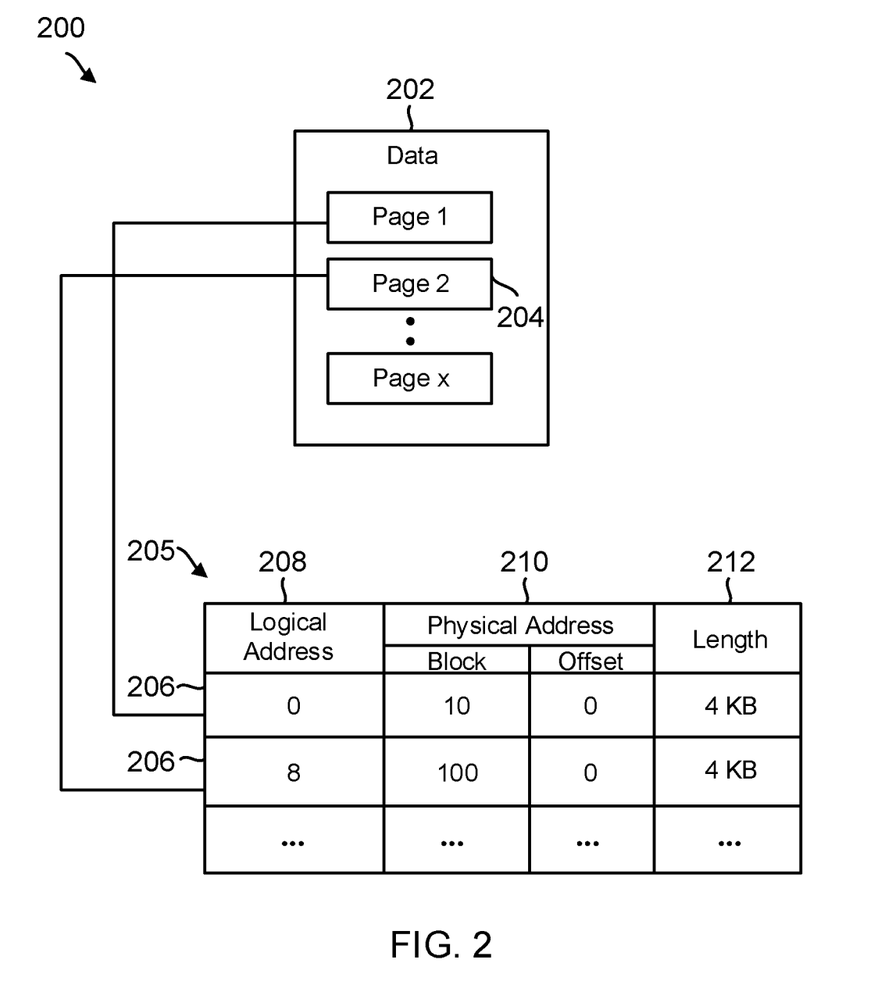
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
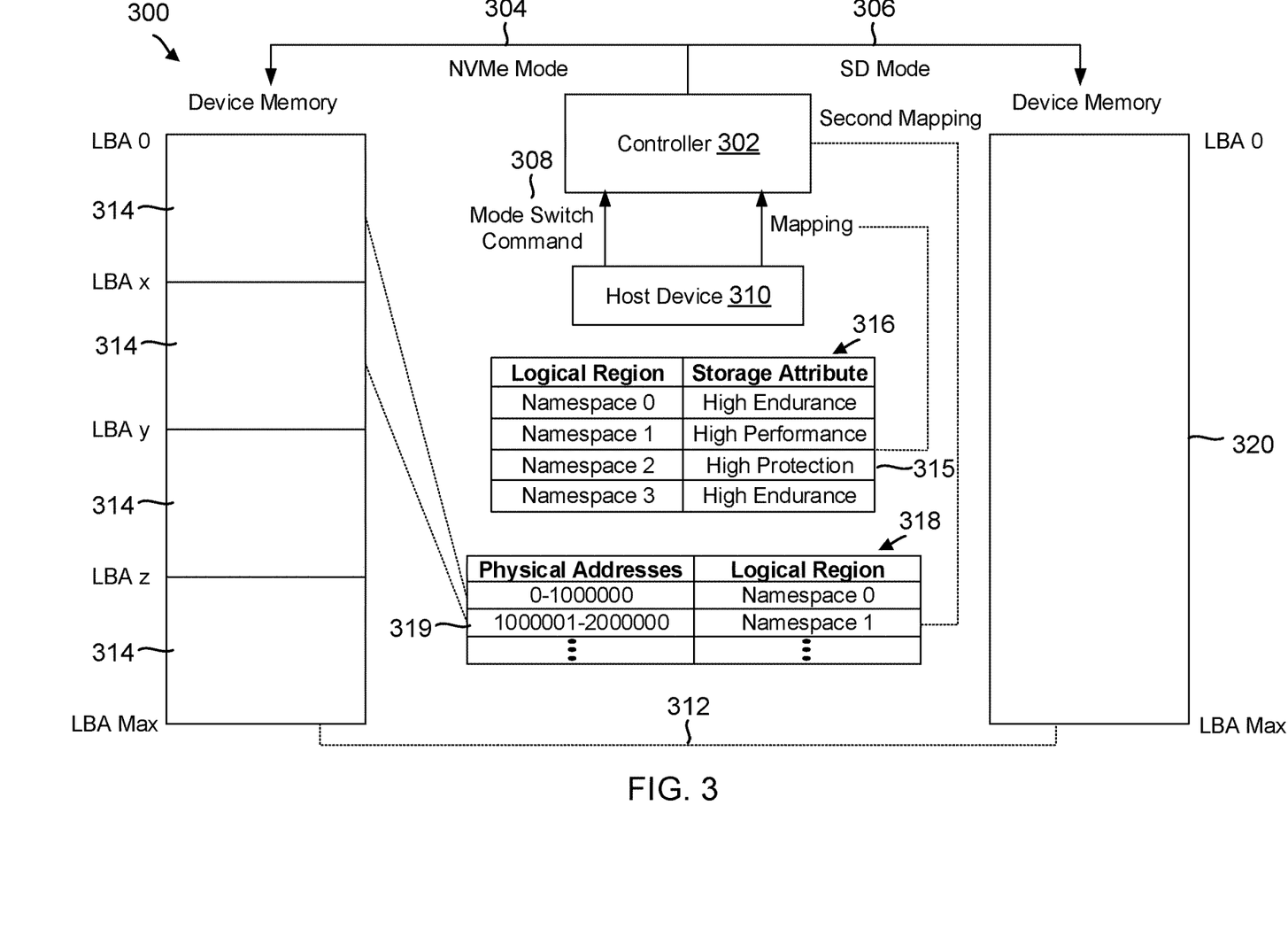
FIG. 3 is a conceptual diagram illustrating an example of a controller of the storage device of FIG. 1 that switches between a NVMe mode and a SD mode in response to a command from a host device.

FIG. 3 illustrates an example diagram 300 of a controller 302 of a multi-protocol storage device that may switch between a first mode 304 (e.g. an NVMe mode) and a second mode 306 (e.g. an SD mode) in response to a command 308 from a host device 310. For example, controller 302 may correspond to controller 123 of the storage device 102 in FIG. 1, and host device 310 may correspond to host 104 in FIG. 1. When the controller 302 operates in the NVMe mode 304, the controller may divide a memory 312 (e.g. NVM 110 of FIG. 1) into different logical regions 314 that are assigned to physical blocks based on storage attributes 315 (e.g. endurance, performance, or protection). Based on a mapping 316 of namespaces to storage attributes 315 received from the host device 310 (e.g. based on the host's endurance, performance, or protection requirements for those particular logical regions), the controller may create a second mapping 318 assigning physical addresses 319 of blocks associated with those storage attributes to the various logical regions. The physical addresses 319 assigned to a particular logical region may be contiguous or non-contiguous and associated with different blocks in one or multiple dies of the storage device. When the controller 302 subsequently receives a command from the host 310 to write data to a particular logical address (e.g. logical address 208) while in the NVMe mode 304, the controller may identify the logical region 314 that includes the received logical address, select a physical block from the assigned physical addresses 319 or blocks to the logical region in second mapping 318, map the particular physical address (e.g. physical address 210) of the selected block to the received logical address in the L2P mapping table (e.g. L2P mapping table 120, 205), and store data in the block at the mapped physical address.

For instance, in the example of FIG. 3, the mapping 316 from the host 310 may indicate that a first logical region spanning LBAs 0-x is a high endurance region that the controller 302 may assign to healthy blocks (e.g. blocks with less P/E cycles or a lower bit error rate (BER)), and that a second logical region spanning LBAs (x+1)-y is a high performance region that the controller 302 may similarly assign to healthy blocks (e.g. blocks having trim settings with low NAND latency during program and read operations, which may similarly include blocks with less P/E cycles or low BERs), where x and y are predefined LBAs. Accordingly, the controller 302 may select blocks from a queue of healthy blocks and assign those blocks to the first and second logical regions in second mapping 318. For instance, as illustrated in FIG. 3, the controller may assign healthy blocks with physical addresses 0-1000000 to the first logical region and healthy blocks with physical addresses 1000001-2000000 to the second logical region. When the controller subsequently receives during the NVMe mode 304 a command from the host to write data to a logical address within one of the first or second logical regions, the controller may select a block from the assigned physical addresses 319 to that logical region (e.g. a block whose physical address is between 0-1000000 or 1000001-2000000 depending on the logical region), map the selected physical address to the received logical address in the L2P mapping table 120, 205, and store data in the block accordingly.

Furthermore, the mapping 316 from the host 310 may indicate that a third logical region spanning LBAs (y+1)-z is a high protection region that the controller 302 may assign possibly to less healthy blocks but which have strong error correction code (ECC) protection (e.g. blocks which are wired to XOR gates having strong protection levels, such as smaller XOR stripe lengths or a larger bin/parity data sizes), and that a fourth logical region starting from LBAs (z+1) and ending with the maximum LBA in the memory 312 is another high endurance region that the controller 302 may also assign to healthy blocks, where y and z are predefined LBAs. Accordingly, the controller 302 may select blocks from a queue of less healthy blocks for the third logical region and from the queue of healthy blocks again for the fourth logical region, and the controller may assign those blocks to the third and fourth logical regions respectively in second mapping 318 as described above. When the controller subsequently receives during the NVMe mode 304 a command from the host to write data to a logical address within one of the third or fourth logical regions, the controller may select, map, and store data in an assigned block accordingly. While the example of FIG. 3 illustrates the controller dividing the memory 312 into four logical regions respectively marked particular storage attributes and physical addresses, this is just one example; any number of logical regions may be mapped respectively to different storage attributes and assigned respectively to different physical addresses in other examples.

Moreover, although the example of FIG. 3 illustrates contiguous physical addresses of blocks in one die being assigned to a particular logical region for the sake of clarity, the physical addresses 319 assigned to a logical region 314 may be contiguous or non-contiguous physical addresses of blocks in any number of dies. For instance, each logical region may be subdivided into multiple sub-regions, with each sub-region being assigned at least one healthy block from a different die. As an example, if namespace 0 corresponds to 96 MB of data, that 96 MB logical region may be sub-divided into three 32 MB sub-regions, with the sub-regions respectively assigned such that the first 32 MB is mapped to block 6 of die 0, the second 32 MB is mapped to block 15 of die 3, and the third 32 MB is mapped to block 12 of die 2. The logical regions 314 may be sub-divided and mapped to physical addresses 319 in dies differently in other examples.

However, when the controller 302 operates in the SD mode 306, the controller may consider the memory 312 as a single logical region 320 which is assigned to physical blocks solely based on availability, and irrespective of storage attributes (e.g. endurance, performance, protection). As the controller may create and maintain separate L2P mappings of logical addresses to physical blocks in the SD mode and in the NVMe mode, disruption of host storage requirements may result when the controller switches back to the NVMe mode. For example, after the controller assigns logical addresses to physical blocks based on storage attributes in the NVMe mode in response to write commands, the controller may receive a command 308 from the host device 310 (or another host device) to switch to the SD mode 306. Subsequently, while in the SD mode, the controller may receive additional write commands from the host including various logical addresses. In such case, the controller may select available physical blocks from a queue of blocks to map to the logical addresses in the L2P table 120, 205, regardless of whether the available blocks have high endurance, performance, or protection levels, and may store data in the blocks accordingly. As a result, when the controller switches back to the NVMe mode 304 in response to another command 308 from the host device 310, the capacity of blocks meeting certain storage attribute requirements may be reduced. For instance, healthy blocks with physical addresses 0-1000000 or 1000001-2000000 may have been mapped indiscriminately to various logical addresses within logical region 320 while in the SD mode, resulting in less healthy blocks which are available to map in the NVMe mode to logical addresses received in future write commands.

Figure 4:
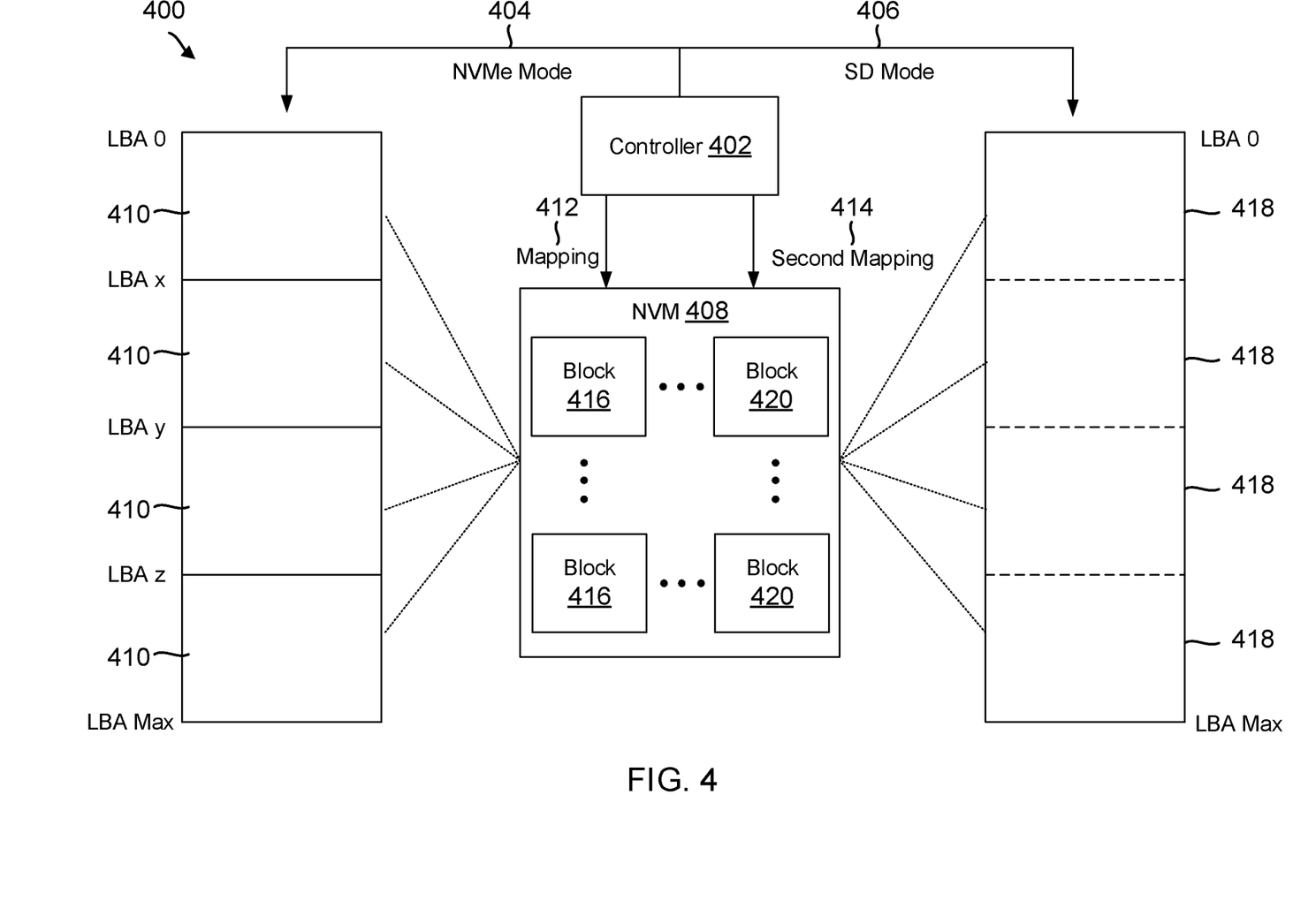
FIG. 4 is a conceptual diagram illustrating an example of a non-volatile memory of the storage device of FIG. 1 in which logical regions are virtually separated based on storage attributes in the SD mode as well as the NVMe mode.

To maintain consistent behavior between different modes of operation in multi-protocol storage devices, the storage device may obtain and store the attribute configurations in flash memory while in one mode (e.g. the NVMe mode) and apply those configurations when mapping logical addresses to physical addresses in another mode (e.g. the SD mode). FIG. 4 illustrates an example diagram 400 of a controller 402 of a multi-protocol device that may switch between a first mode 404 (e.g. an NVMe mode) and a second mode 406 (e.g. an SD mode) in response to a command from a host device. For example, controller 402 may correspond to controller 123, 302 of the storage device 102 of FIGS. 1 and 3. As described above, when the controller 402 operates in the NVMe mode 404, the controller may divide a non-volatile memory 408 (e.g. corresponding to memory 312 of FIG. 3 or NVM 110 of FIG. 1) into different logical regions 410 that are assigned to physical blocks based on storage attributes (e.g. storage attributes 315 of FIG. 3). The NVM 408 may be divided into logical regions 410 based on a mapping 412 received from the host device (e.g. mapping 316 of namespaces to storage attributes 315) and based on a second mapping 414 created by the controller 402 of the storage device (e.g. second mapping 318 assigning physical blocks associated with those storage attributes to the various logical regions). When the controller 402 receives write commands from the host to write data to various logical addresses while in the NVMe mode 404, the controller may select, map, and store data in blocks 416 (e.g. blocks 114 of FIG. 1) of the NVM 408 associated with different storage attributes and tied to the logical regions 410 based on the mappings 412, 414 as described above.

While operating in the NVMe mode 404 or before switching to the SD mode 406 in response to a command from the host, the controller 402 may store the storage attributes of assigned blocks or the mapping configurations of assigned blocks as metadata in the NVM 408. For instance, the controller may store mappings 412, 414 as metadata in a reserved block of the NVM 408 or in a data structure created using controller firmware. Accordingly, the metadata may point to the pool of physical blocks allocated to known namespaces based on their health (endurance or performance), protection level, or other storage attribute (e.g. physical addresses 0-1000000 are allocated to LBAs 0-x, physical addresses 1000001-2000000 are allocated to LBAs x+1-y, etc., where x and y are predefined LBAs). After the controller 402 switches to the SD mode 406, the controller may read the metadata from the NVM 408 to obtain the stored mappings 412, 414, from which the controller in the SD mode may identify the storage attributes marked for different logical regions and the physical blocks marked for different namespaces based on endurance, performance, or protection requirements in the NVMe mode.

Based on these mappings, the controller may virtually separate the NVM 408 into logical regions 418 (e.g. aligned with logical regions 410) and store data in blocks assigned to those virtual logical regions 418 while in the SD mode similarly as when in the NVMe mode. For instance, when the controller receives write commands including logical addresses from the host while in the SD mode, the controller may identify the logical region 418 including the received logical address, select a block whose physical address is assigned to that logical region based on storage attributes and blocks identified from the mappings 412, 414 (e.g. healthy blocks with high endurance whose physical addresses are within 0-1000000 or healthy blocks with high performance whose physical addresses are within 1000000-2000000 depending on the logical region identified), map the physical address of the selected block to the received logical address in the L2P mapping table 120, 205, and store data in the block accordingly.

In this way, the controller 402 may select, map, and store data in blocks 420 (e.g. blocks 114 of FIG. 1) of the NVM 408 based on the storage attribute mappings such that host storage requirements may continue to be applied when back in the NVMe mode. For instance, when the controller operates in SD mode 406, the controller may refrain from mapping less healthy blocks to logical addresses in high endurance or high performance regions so that the logical region separation may remain applicable when the controller switches back to NVMe mode 404. Thus, the endurance or other storage requirements of a particular logical region may be maintained as the controller switches between the NVMe and SD modes, since the capacity of healthy blocks may not be indiscriminately reduced as a result of block assignment to various logical regions based solely on first availability.

Figure 5:
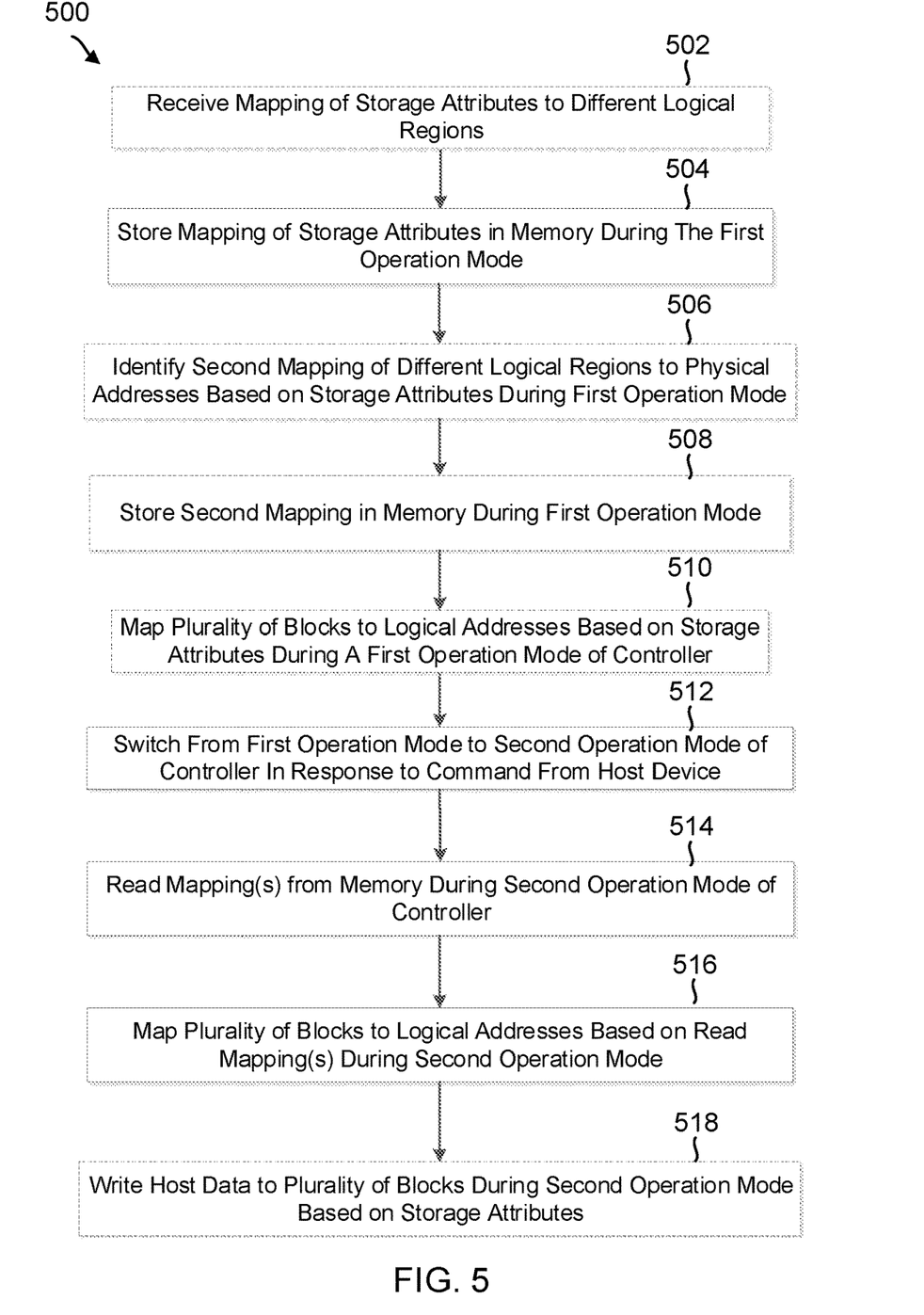
FIG. 5 is a flow chart illustrating a method for mapping blocks to different logical regions in the NVMe mode and SD mode based on storage attributes, as performed by the storage device of FIG. 1.

FIG. 5 illustrates an example flow chart 500 of a method for mapping blocks to different logical regions based on storage attributes in different modes of operation of a multi-protocol storage device. For example, the method can be carried out in a storage device 102 such as the one illustrated in FIG. 1. Each of the steps in the flow chart can be controlled using the controller as described below (e.g. controller 123, 302, 402), or by some other suitable means. Optional aspects are illustrated in dashed lines.

As represented by block 502, the controller may receive a mapping of storage attributes to different logical regions. Each storage attribute may be associated with a block of a memory. The mapping may be received from a host device. For example, referring to FIGS. 3 and 4, the controller 302, 402 may receive a mapping 316, 412 of storage attributes 315 (e.g. high or low endurance, high or low performance, high or low protection, etc.) to different logical regions 314, 410 from the host device 310. Each storage attribute 315 may be associated with a block 416, 420 of a memory (e.g. NVM 408 or memory 312) of the storage device. For example, some blocks 416, 420 may be blocks with less P/E cycles or a low BER (e.g. high endurance blocks), blocks with more P/E cycles or a high BER (e.g. low endurance blocks), blocks having trim settings with short NAND latency during program and read operations (e.g. high performance blocks), blocks having trim settings with long NAND latency during program and read operations (e.g. low performance blocks), blocks with strong ECC protection (e.g. high protection blocks such as blocks wired to XOR gates having smaller XOR stripe lengths or larger bin/parity data sizes), or blocks with weak ECC protection (e.g. low protection blocks such as blocks wired to XOR gates having larger XOR stripe lengths or smaller bin/parity data sizes).

As represented by block 504, the controller may store in the memory the mapping of the storage attributes to the different logical regions during the first operation mode. The first operation mode may comprise a NVMe mode 404. For example, referring to FIG. 4, the controller 402 may store in the memory or NVM 408 the mapping 412 of the storage attributes (e.g. storage attributes 315) to the different logical regions 410 while the controller is operating in the NVMe mode 404. For instance, the controller may store the mapping 412 as metadata in a reserved block of the NVM 408.

As represented by block 506, the controller may identify a second mapping of the different logical regions to physical addresses based on the storage attributes during the first operation mode. For example, referring to FIGS. 3 and 4, during the NVMe mode 304, 404, the controller 302, 402 may identify a second mapping 318, 414 of the logical regions 314, 410 to physical addresses 319 based on the storage attributes 315. For instance, if the controller determines from mapping 316 that one of the logical regions 314, 410 is to be associated with high endurance blocks, the controller may assign physical addresses 319 of blocks 416, 420 with less P/E cycles or low BER to that respective logical region in the second mapping 318, 414. Similarly, if the controller determines from the mapping 316 that another of the logical regions 314, 410 is to be associated with high performance blocks, the controller may assign the physical addresses 319 of blocks 416, 420 with low NAND latency trim settings to that respective logical region in the second mapping 318, 414.

As represented by block 508, the controller may store the second mapping in the memory during the first operation mode. For example, referring to FIG. 4, after identifying the second mapping 414, the controller 402 may store the second mapping 414 in the NVM 408 while operating in the NVMe mode 404. For instance, the controller may store the second mapping 414 as metadata in a reserved block of the NVM 408 along with the first mapping 412.

As represented by block 510, the controller may map a plurality of blocks to logical addresses based on the storage attributes during a first operation mode of the controller. For example, referring to FIGS. 3 and 4, in response to receiving a write command from the host device 310 including a logical address during the NVMe mode 304, 404, the controller 302, 402 may identify a logical region 314, 410 including the received logical address, and select a block 416 whose physical address 319 is assigned to the logical region 314, 410 in the second mapping 318. The second mapping 318 may be based on the storage attribute 315 associated with the logical region 314, 410 in the first mapping 316 received from the host device 310. After selecting the physical address, the controller may map the physical address of the selected block to the received logical address in the L2P mapping table (e.g. L2P mapping table 120, 205), and the controller may write data to the mapped block accordingly.

As represented by block 512, the controller may switch between the first operation mode to a second operation mode in response to a command from the host device. The second operation mode may comprise a SD mode. For example, referring to FIGS. 3 and 4, the controller may switch between the NVMe mode 304, 404 and the SD mode 306, 406 in response to a mode switch command 308 received from the host device 310. The controller may switch to the SD mode from the NVMe mode after storing the mappings 316, 412 and 318, 414 in the NVM 408. While in the NVMe mode, the controller may communicate with the host device using a PCIe interface (e.g. under NVMe protocols), while in the SD mode, the controller may interface with the host device using an SD interface (e.g. under SD protocols). In one example, while in the SD mode, the controller may create and maintain a separate L2P mapping table (e.g. L2P mapping table 120, 205) than in the NVMe mode. Thus, the controller may map one physical block to a logical address in the NVMe mode, and the controller may map another physical block to the same logical address in the SD mode. Accordingly, the controller may write and read data associated with the same logical address in different blocks depending on whether the controller is operating in the NVMe mode or the SD mode. In another example, the controller may retrieve data associated with a logical address from a block in the SD mode that is written and mapped to the same logical address in the NVMe mode. For instance, if the controller receives a write command including LBA 100 in the NVMe mode, the controller may map that LBA to die 0, block 3 in the NVMe mode, and if the controller subsequently receives a read command for LBA 100 in the SD mode, the controller may similarly read the data from die 0, block 3 in the SD mode. Thus, in this example, the L2P mapping table 120, 205 may be common between the NVMe mode and the SD mode. However, if another physical block is to be associated to the logical region that includes LBA 100 in the SD mode (e.g. in response to receiving a write command including another LBA in that logical region), the controller may create the new association in the SD mode accordingly based on the storage attributes and mappings identified in the NVMe mode as described below.

As represented by block 514, the controller may read the mapping of storage attributes to different logical regions from the memory during the second operation mode. The controller may also read the second mapping of different logical regions to physical addresses from the memory during the second operation mode. For example, referring to FIG. 4, while operating in the SD mode 406, the controller 402 may fetch the metadata from the NVM 408 that was previously stored during the NVMe mode 404 in order to identify the stored mappings 412, 414.

As represented by block 516, the controller may map a plurality of blocks to logical addresses based on the mappings during the second operation mode. For example, referring to FIG. 4, the controller 402 may virtually divide the NVM 408 into different logical regions 418 associated with storage attributes (e.g. storage attributes 315) based on the mapping 412 read from the NVM 408 while operating in the SD mode 406. For example, the mapping 412 may indicate that LBAs 0–x, x+1–y, y+1–z, and z+1–max are to be high endurance, high performance, high protection, and high endurance regions, respectively, where x, y, z, and max are predefined, and therefore the controller may virtually divide the NVM 408 into logical regions 418 accordingly during the SD mode 406. The controller may then identify the assigned blocks to those logical regions 418 based on the second mapping 414. For example, the second mapping 414 may indicate that physical addresses 0-1000000 are blocks with less P/E cycles or BER that may be assigned to the first logical region 418 corresponding to LBAs 0–x, while physical addresses 1000001-2000000 are blocks with low NAND latency trim settings that may be assigned to the second logical region 418 corresponding to LBAs x+1–y. Therefore, when the controller receives write commands from the host device including logical addresses during the SD mode 406, the controller may map those logical addresses to physical addresses based on the mappings 412, 414 read from the NVM 408. For instance, in response to receiving a write command from the host device including a logical address, the controller 402 may identify a logical region 418 including the received logical address, and select a block 420 whose physical address (e.g. physical address 319) is assigned to the logical region 418 in the second mapping 414 (which is in turn based on the first mapping 412). After selecting the physical address, the controller may map the physical address of the selected block to the received logical address in the L2P mapping table (e.g. L2P mapping table 120, 205).

Finally, as represented by block 518, the controller may write or store host data in the blocks during the second operation mode based on the storage attributes. For example, referring to FIG. 4, the controller 402 may store data received from the host in blocks 420 of the NVM 408 while operating in the SD mode 406. The physical addresses of the blocks 420 may be mapped to received logical addresses within the logical regions 418, which are virtually created during the SD mode based on storage attributes as described above (e.g. based on mappings 412, 414).

Accordingly, the multi-protocol storage device described in the present disclosure may maintain compatibility between protocols or modes of operation with respect to storing data in different logical regions of memory based on endurance, performance, protection, or other storage requirements of the host. Mappings of logical regions and physical addresses based on storage attributes are stored while the storage device is operating in one mode and accessed from memory while the storage device is operating in a different mode. Based on these mappings, the storage device may continue to allocate physical blocks with logical addresses in either mode, without disrupting endurance, performance, or protection requirements by the host as a result of mode switches.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a memory including a plurality of blocks, wherein each of the blocks is associated with a storage attribute comprising an endurance level, a performance level, or a protection level;
a controller configured to receive a mapping of the storage attributes to different logical regions, to store the mapping in the memory during a first operation mode of the controller, to read the mapping from the memory during a second operation mode of the controller, and to map the plurality of blocks to logical addresses based on the mapping during the second operation mode, wherein the first operation mode comprises a non-volatile memory express (NVMe) mode, and the second operation mode comprises a Secure Digital (SD) mode.

2. The storage device of claim 1, wherein the mapping is received from a host device.

3. The storage device of claim 1, wherein the endurance level comprises a number of program/erase (P/E) cycles or a bit error rate (BER), the performance level comprises a latency of a program operation or a read operation, and the protection level comprises an exclusive-or (XOR) stripe length or a parity data size.

4. The storage device of claim 1, wherein the memory comprises a non-volatile memory (NVM), and the controller is configured to store the mapping in the NVM.

5. The storage device of claim 1, wherein the controller is further configured to identify a second mapping of the different logical regions to physical addresses based on the storage attributes during the first operation mode, and to store the second mapping in the memory during the first operation mode.

6. The storage device of claim 5, wherein the controller is further configured to read the second mapping from the memory during the second operation mode, and to map the plurality of blocks to the logical addresses based on the second mapping during the second operation mode.

7. The storage device of claim 1, wherein the controller is further configured to store host data in the plurality of blocks during the second operation mode based on the storage attributes.

8. A storage device, comprising:
a memory including a plurality of blocks, wherein each of the blocks is associated with a storage attribute comprising an endurance level, a performance level, or a protection level;
a controller configured to switch between a first operation mode and a second operation mode, to store in the memory a mapping of the storage attributes to different logical regions during the first operation mode, to read the mapping from the memory during the second operation mode, and to map the plurality of blocks to logical addresses based on the mapping during the second operation mode, wherein the first operation mode comprises a non-volatile memory express (NVMe) mode, and the second operation mode comprises a Secure Digital (SD) mode.

9. The storage device of claim 8, wherein the controller is configured to switch between the first operation mode and the second operation mode in response to a command from a host device.

10. The storage device of claim 8, wherein the controller is further configured to receive the mapping from a host device during the first operation mode.

11. The storage device of claim 8, wherein the memory comprises a non-volatile memory (NVM) including the plurality of blocks, and the controller is configured to store the mapping in one of the blocks of the NVM.

12. The storage device of claim 8, wherein the controller is further configured to identify during the first operation mode a second mapping of the different logical regions to physical addresses based on the storage attributes, and to store the second mapping in a block of the memory during the first operation mode.

13. The storage device of claim 12, wherein the controller is further configured to read the second mapping from the block of the memory during the second operation mode, and to map the plurality of blocks to the logical addresses based on the second mapping during the second operation mode.

14. The storage device of claim 8, wherein the controller is further configured to write host data to at least one of the blocks during the second operation mode based on the storage attributes.

15. A storage device, comprising:
a memory including a first plurality of blocks and a second plurality of blocks, wherein each of the first plurality of blocks and each of the second plurality of blocks is associated with a storage attribute comprising an endurance level, a performance level, or a protection level;
a controller configured to map the first plurality of blocks to logical addresses based on the storage attributes during a first operation mode of the controller, to store in the memory a mapping of the storage attributes to different logical regions during the first operation mode, to read the mapping from the memory during a second operation mode of the controller, and to map the second plurality of blocks to the logical addresses based on the mapping during the second operation mode, wherein the first operation mode comprises a non-volatile memory express (NVMe) mode, and the second operation mode comprises a Secure Digital (SD) mode.

16. The storage device of claim 15, wherein the controller is configured to switch between the NVMe mode and the SD mode in response to a command from a host device.

17. The storage device of claim 16, wherein the memory comprises a non-volatile memory (NVM), and the controller is configured to store the mapping in the NVM prior to switching to the SD mode.

18. The storage device of claim 15, wherein the controller is further configured to identify a second mapping of the different logical regions to physical addresses based on the storage attributes during the first operation mode.

19. The storage device of claim 18, wherein the controller is further configured to store the second mapping in the memory during the first operation mode, to read the second mapping from the memory during the second operation mode, and to map the second plurality of blocks to the logical addresses based on the second mapping during the second operation mode.

20. The storage device of claim 15, wherein the controller is further configured to store host data in the second plurality of blocks during the second operation mode based on the storage attributes.

* * * * *